United States Patent [19]

Matsuno

[11] Patent Number: 5,719,770
[45] Date of Patent: Feb. 17, 1998

[54] VEHICLE SPEED CALCULATION SYSTEM FOR FOUR WHEEL DRIVE VEHICLE AND THE METHOD THEREOF

[75] Inventor: Koji Matsuno, Nitta County, Japan

[73] Assignee: Fuji Jukogyo Kabushiki Kaisha, Tokyo, Japan

[21] Appl. No.: 498,076

[22] Filed: Jul. 3, 1995

[30] Foreign Application Priority Data

Jul. 28, 1994  [JP]  Japan .................................. 6-176970

[51] Int. Cl.$^6$ ...................................................... B60K 41/00
[52] U.S. Cl. ............................ 364/426.015; 364/426.018
[58] Field of Search ...................... 364/426.015, 426.016, 364/426.017, 426.018, 426.019, 426.027, 426.028, 426.037

[56] References Cited

U.S. PATENT DOCUMENTS

| | | | |
|---|---|---|---|
| 4,702,337 | 10/1987 | Burckhardt et al. | 180/197 |
| 4,783,126 | 11/1988 | Arikawa | 303/96 |
| 4,793,662 | 12/1988 | Arikawa | 303/96 |
| 4,805,103 | 2/1989 | Matsuda | 364/426.02 |
| 4,893,880 | 1/1990 | Arikawa | 303/110 |
| 4,933,858 | 6/1990 | Matsuda | 364/426.02 |
| 4,980,831 | 12/1990 | Katayama et al. | 364/426.02 |
| 5,093,790 | 3/1992 | Shiraishi et al. | 364/426.02 |
| 5,253,728 | 10/1993 | Matsuno et al. | 180/140 |
| 5,259,476 | 11/1993 | Matsuno et al. | 180/197 |
| 5,282,138 | 1/1994 | Sano | 364/426.03 |
| 5,332,059 | 7/1994 | Shirakawa et al. | 180/197 |
| 5,362,139 | 11/1994 | Watanabe | 303/96 |
| 5,387,031 | 2/1995 | Watanabe | 303/109 |
| 5,414,628 | 5/1995 | Yoshino | 364/426.02 |
| 5,458,405 | 10/1995 | Watanabe | 303/173 |
| 5,470,135 | 11/1995 | Shitani et al. | 303/122.03 |
| 5,498,072 | 3/1996 | Shimizu | 303/191 |
| 5,559,702 | 9/1996 | Kojima et al. | 364/426.02 |

*Primary Examiner*—Kevin Teska
*Assistant Examiner*—Stephen J. Walder, Jr.
*Attorney, Agent, or Firm*—Martin A. Farber

[57] ABSTRACT

A vehicle speed calculation system capable of calculating a reference vehicle speed of a fourwheel drive vehicle with high accuracy when a fourwheel slip or lock occurs. An integrated value of a longitudinal acceleration is forcedly used for the calculation of the reference vehicle speed when the vehicle is accelerated and a variation of a lowest wheel speed is negative or when the vehicle is decelerated and a variation of a highest wheel speed is positive.

7 Claims, 9 Drawing Sheets

$\Delta \omega \min < 0$ $\Sigma G < \Delta \omega \min$ $\Sigma G > \Delta \omega \min$

P.I. ; PRESSURE INCREASE

P.H. ; PRESSURE HOLDING

P.D. ; PRESSURE DECREASE $\Delta \omega max > 0$ $\Delta \omega max < \Sigma G$ $\Delta \omega max > \Sigma G$

VEHICLE SPEED CALCULATION SYSTEM FOR FOUR WHEEL DRIVE VEHICLE AND THE METHOD THEREOF

BACKGROUND OF THE INVENTION

1. Field of the Invention

The present invention relates to a vehicle speed calculation system for a fourwheel drive vehicle and particularly to a system for calculating a reference vehicle speed under any conditions including when a skid or a lock occur on four wheels.

2. Prior Art

In recent years more fourwheel drive vehicles are equipped with an anti-lock braking system and/or a traction control system. The anti-lock braking system prevents the vehicle wheels from being locked by releasing braking force periodically when the wheels are locked and the traction control system prevents the vehicle wheel from getting into a slip by varying driving force periodically when a slip occurs. Either of these systems are controlled by the judgment of a slip state or a lock state from the relationship between wheel speed and vehicle speed.

In case of a twowheel drive vehicle, since it has driven wheels, the vehicle speed can be detected accurately based on the relationship between the driving wheels and the driven wheels, even when a slip or lock occur. However, in case of a fourwheel drive vehicle, since it has no driven wheels, an accurate vehicle speed can not be detected and hence it is difficult to control those systems mentioned above properly. Therefore, in order to introduce the anti-lock braking system or the traction control system onto the fourwheel drive vehicle, it is required that the vehicle speed be detected with high accuracy, even when a slip or a lock occur on all four wheels.

With respect to the prior arts of the calculation of vehicle speed, for example, Japanese Unexamined Patent Application No. Toku-Gan-Hei 5-26196 discloses a calculation method of the vehicle speed to be used for the anti-lock braking control or the like in the fourwheel drive vehicle. In this prior art, it is judged whether the four wheels are at the grip state or at the slip state from the relationship between the variation of the wheel speed at the lowest velocity wheel and the integrated value of the longitudinal acceleration, and it is judged whether or not the four wheels are at the lock state from the relationship between the variation of the wheel speed at the highest velocity wheel and the integrated value of the longitudinal acceleration. Further, when it is judged that the four wheels are at the slip state or the lock state, the vehicle speed is calculated by increasing or decreasing the integrated value of the longitudinal acceleration.

However, the calculation method according to this prior art has a possibility that erroneous data may be produced when the four wheels get into a slip or a lock gradually, because a slip or lock states on the four wheels are judged by comparing the variation of the wheel speed per predetermined sampling time with the integrated value of the longitudinal acceleration per the same sampling time. To avoid this disadvantage, for example, as an alternative way, it can be considered that, when the vehicle is accelerated, the variation of the wheel speed at the lowest velocity wheel is compared with the integrated value of the longitudinal acceleration per the sampling time, namely, the variation of the vehicle speed per the sampling time, then the vehicle speed is calculated by accumulating the smaller one of these variations successively.

According to this method, however, when the four wheels get into a slip during acceleration, the lowest speed wheel changes its speed fractionally with a short period by the operation of the traction control. In this case, the variation between the top and the bottom of the wheel speed at the lowest speed wheel is chosen as an acceleration value of that moment. As illustrated in FIG. 7 (b), the vehicle speed Vr calculated at this moment becomes temporarily lower than the actual vehicle speed H, since the actual vehicle speed H is relatively large. This lowering of the calculated vehicle speed occurs repeatedly within a short period of time and, as a result of this, the calculated vehicle speed Vr becomes gradually lower than the actual vehicle speed H, as shown by a broken line of FIG. 7 (b). Thus, this calculation method of vehicle speed has an uncertainty in an accuracy of calculation.

SUMMARY OF THE INVENTION

The present invention is intended to obviate the disadvantages of the prior arts and its object is to provide a calculation system and method capable of calculating a reference vehicle speed of a fourwheel drive vehicle with high accuracy when the vehicle gets into a slip or lock on the all four wheels.

In order to achieve the above object, the vehicle speed calculation system according to the present invention comprises:

highest wheel speed selecting means responsive to the wheel speed signal for selecting a highest wheel speed and for outputting a highest wheel speed signal;

first variation calculating means responsive to the highest wheel speed signal for calculating a variation of the highest wheel speed per a unit time;

lowest wheel speed selecting means responsive to the wheel speed signal for selecting a lowest wheel speed and for outputting a lowest wheel speed signal;

second variation calculating means responsive to the lowest wheel speed signal for calculating a variation of the lowest wheel speed per a unit time and for outputting a variation signal of the lowest wheel speed per a unit time;

integrating means responsive to the longitudinal acceleration signal for calculating an integrated value of the longitudinal acceleration per a unit time and for outputting the integrated value; and reference vehicle speed calculating means for selecting the integrated value when the vehicle is accelerated and the variation of the lowest wheel speed per a unit time is negative or when the vehicle is decelerated and the variation of the highest wheel speed per a unit time is positive and for calculating a reference vehicle speed by adding the integrated value to the previous reference vehicle speed.

Thus obtained reference vehicle speed is used to control the anti-lock braking control system or the traction control system installed on the fourwheel drive vehicle even when a fourwheel slip or lock occurs.

BRIEF DESCRIPTION OF THE DRAWINGS

The present invention will be understood more fully from the accompanying drawings of the preferred embodiment of the invention. In the drawings.

DETAILED DESCRIPTION OF THE PREFERRED EMBODIMENTS

Figure 2:
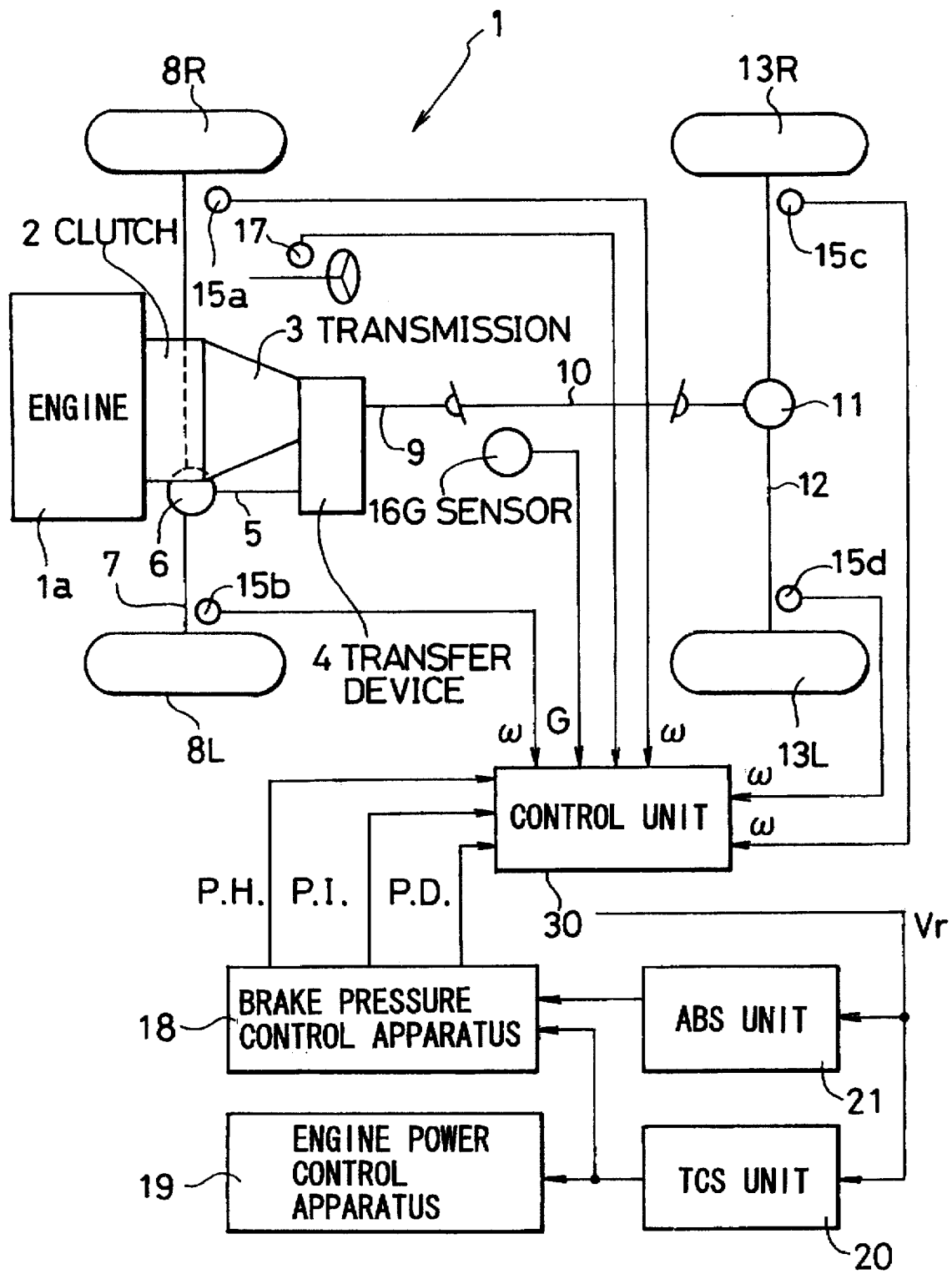
FIG. 2 is a view showing a driving system and a control system of a fourwheel drive vehicle according to the present invention.

Referring now to FIG. 2, first a drive train system according to the present invention will be described.

Numeral 1 denotes a fourwheel drive vehicle and numeral 1a does an engine from which an output is transmitted to a transfer device 4 like a center differential through a clutch 2 and a transmission 3. Further, the front-side output of the transfer device 4 is transmitted to a front-left wheel 8L and a front-right wheel 8R through a front drive shaft 5, a front differential 6 and a front axle 7 and the rear-side output of the transfer device 4 is transmitted to a rear-right wheel 13L and a rear-right wheel 13R through a rear drive shaft 9, a propeller shaft 10, a rear differential 11 and a rear axle 12.

Next, a control system according to the present invention will be explained.

Vehicle speed sensors 15a, 15b, 15c and 15d are disposed at the front wheels 8L, 8R and the rear wheels 13L, 13R respectively so as to detect a wheel speed ω individually. Further, a G sensor 16 is disposed at the center of the body of the vehicle 1 so as to detect a longitudinal acceleration G of the vehicle 1. Furthermore, a brake switch 17 is disposed at the brake system so as to output a signal when a brake pedal is depressed. These signals from the vehicle speed sensors 15a, 15b, 15c and 15d, the G sensor 16 and the brake switch 17 are inputted to a control unit 30 in which a reference vehicle speed Vr is successively calculated in various running conditions.

This reference vehicle speed Vr is inputted to a TCS (Traction Control System) unit 20. In the TCS unit 20, when it is judged that a slip has occured on four wheels based on this reference vehicle speed signal, a TCS signal is outputted to both a brake pressure control apparatus 18 and an engine output control apparatus 19 where a traction control is performed by varying a wheel speed in order to prevent the four wheels from getting into a slip. Further, on the other hand, in an ABS (Anti-lock Braking System) unit to which the reference vehicle speed Vr is inputted, when it is judged that locks have occured on four wheels from a signal of this reference vehicle speed Vr and other signals, an ABS signal is outputted to the braking pressure control apparatus 18 where an anti-lock braking control is performed by varying a wheel speed in order to prevent the four wheels locking. In performing the traction control or the anti-lock braking control, it is necessary that the reference vehicle speed Vr is calculated with high accuracy.

Figure 1:
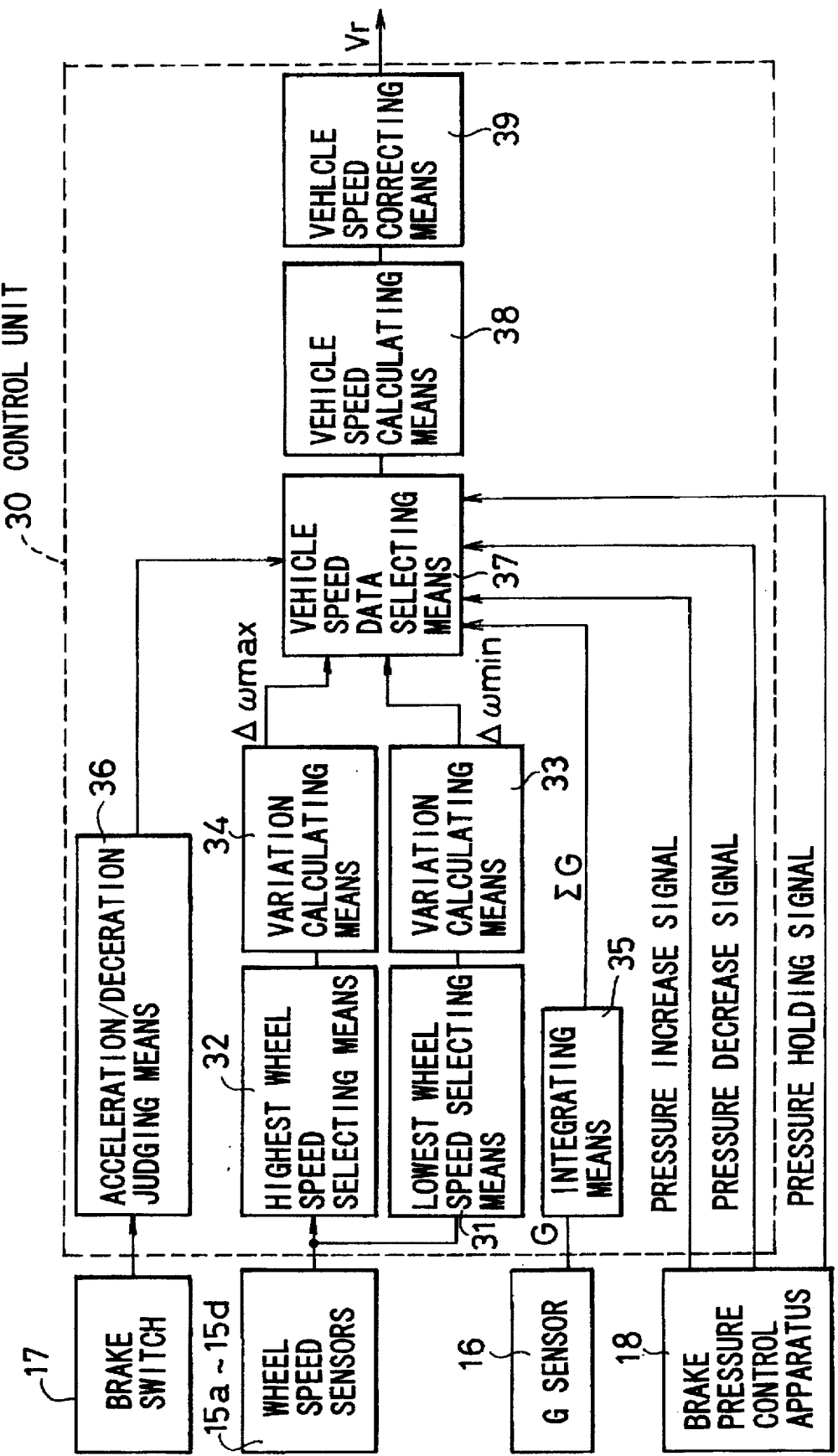
FIG. 1 is a block diagram of means constituting a vehicle speed calculation system according to the present invention.

Referring to FIG. 1, the vehicle speed calculation mechanism of the control unit 30 will be described.

In calculating the reference vehicle speed Vr, when the vehicle 1 is accelerated, if the variation Δωmin of the lowest speed wheel per the sampling time interval is negative, the integrated value ΣG of the longitudinal acceleration is used and if it is not negative, comparing the Δωmin with the ΣG, the smaller one is chosen as an acceleration to be calculated and the reference vehicle speed Vr is calculated based on this acceleration value. Further, since the lowering of the reference vehicle speed Vr caused due to the fluctuation of the wheel speed as described before occurs during a pressure regulation of the braking control, taking the operation of pressure restoration and pressure reduction into consideration, the integrated value ΣG of the longitudinal acceleration is forced to be used during this operation, thus the lowering of the reference vehicle speed Vr can be prevented towards an improvement of accuracy.

When the vehicle 1 is decelerated, the wheel speed ωmax of the highest speed wheel is used and the controls of pressure restoration and pressure reduction is performed similarly even at the anti-lock braking control when four wheels are locked.

The wheel speed ω data from the wheel speed sensors 15a through 15d are inputted to lowest wheel speed selecting means 31 and highest wheel speed selecting means 32. In the lowest wheel speed selecting means 31, the lowest wheel speed ωmin, i.e., the wheel speed of the wheel whose grip is largest of the four wheels when the vehicle is accelerated (wheels slips most easily during acceleration) and whose speed is nearest to the vehicle speed, is selected and in the highest wheel speed selecting means 32, the highest wheel speed ωmax, i.e., the wheel speed of the wheel whose grip is largest of the four wheels when the vehicle 1 is decelerated (wheels are locked most easily during deceleration) and whose speed is nearest to the vehicle speed, is selected.

These lowest and highest wheel speeds ωmin and ωmax are respectively inputted to variation calculating means 33, 34 in which the variation Δωmin of the lowest speed wheel and the variation Δωmax of the highest speed wheel are obtained from the previous values and the present values. The longitudinal acceleration G is inputted to integrating means 35 where the integrated value ΣG of the longitudinal acceleration, i.e., the variation of the vehicle speed per a unit time, is obtained. Specifically, this integrated value ΣG is obtained by multiplying a mean value of the longitudinal acceleration within the sampling time interval (for example, 10 ms) by the sampling time interval.

The signal from the brake switch 17 is inputted to Acceleration/deceleration judging means 36 in which the judgment is made, namely, "deceleration" if the switch is turned on and "acceleration" if it is otherwise. Further, the brake pressure control apparatus 18 generates a pressure increase signal, a pressure decrease signal and a pressure holding signal to vehicle speed data selecting means 37. Other signals, such as a signal of judgment from the acceleration/deceleration judging means 36, the variation signals from the variation calculating means 33 and 34, the integrated value signal from the integrating means 35 are also inputted to the vehicle speed data selecting means 37. In the vehicle speed data selecting means 37, when the vehicle is accelerated, fundamentally the smaller acceleration value among the variation Δωmin of the wheel speed at the lowest speed wheel and the integrated value ΣG of the longitudinal acceleration, is selected and, if the variation Δωmin is negative and further the brake control is in the pressure increase state or the pressure decrease state, the integrated value ΣG of the longitudinal acceleration is used. Further, when the vehicle is decelerated, fundamentally the smaller deceleration value among the variation Δωmax of the wheel speed at the highest speed wheel and the integrated value ΣG of the longitudinal acceleration, is selected and, if the variation Δωmax is positive and further the brake control is in the pressure restoration state or the pressure reduction state, the integral value ΣG is employed.

The variation Δωmin of the wheel speed at the lowest speed wheel, the variation Δωmax of the wheel at the highest speed wheel or the integrated value ΣG of the longitudinal acceleration thus selected are inputted to vehicle speed calculating means 38 where it is added to the previous reference vehicle speed Vr(k−1). Where Vr' denotes a product of the addition, when the vehicle is accelerated, comparing the Vr' with the present ωmin, either of the two is let to be the present reference vehicle speed Vr and when the vehicle is decelerated, comparing the Vr' with the present ωmax, either one among these two is let to be the reference vehicle speed Vr.

Then, the reference vehicle speed Vr is inputted to vehicle speed correcting means 39 where the previous reference vehicle speed is reset to the present one and the present reference vehicle speed Vr is outputted from the control unit 30.

Next, the function of the embodiment will be described.

The power from the engine 1a is transmitted to the transfer apparatus 4 through the transmission 3 and is distributed forward and backward. The power transmitted forward is distributed between the front-left wheel 8L and the front-right wheel 8R and the power transmitted backward is distributed between the rear-left wheel 13L and the rear-right wheel 13R.

Figure 3:
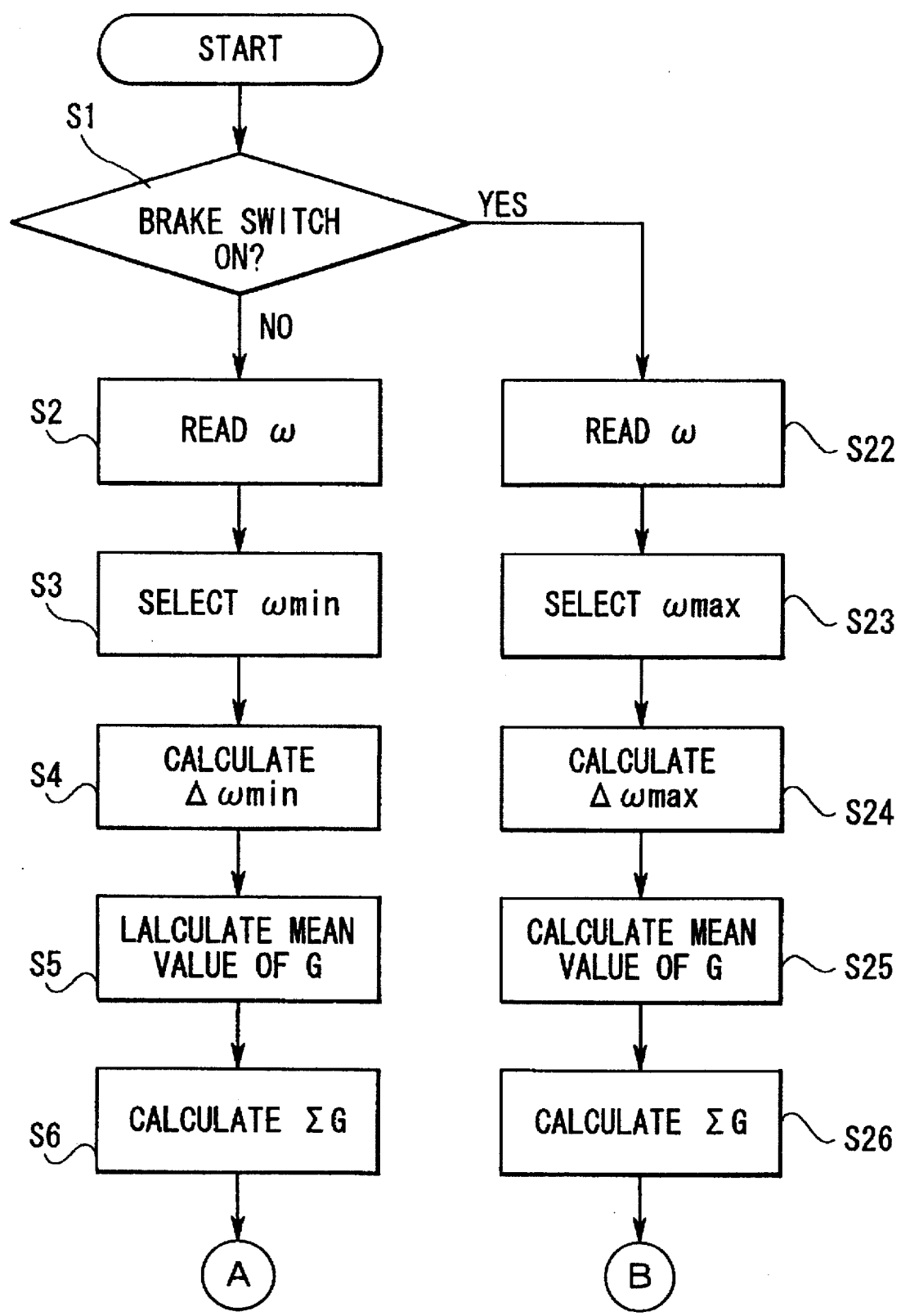
FIG. 3 is a flowchart showing a control process for calculating a vehicle speed according to the present invention.
Figure 4:
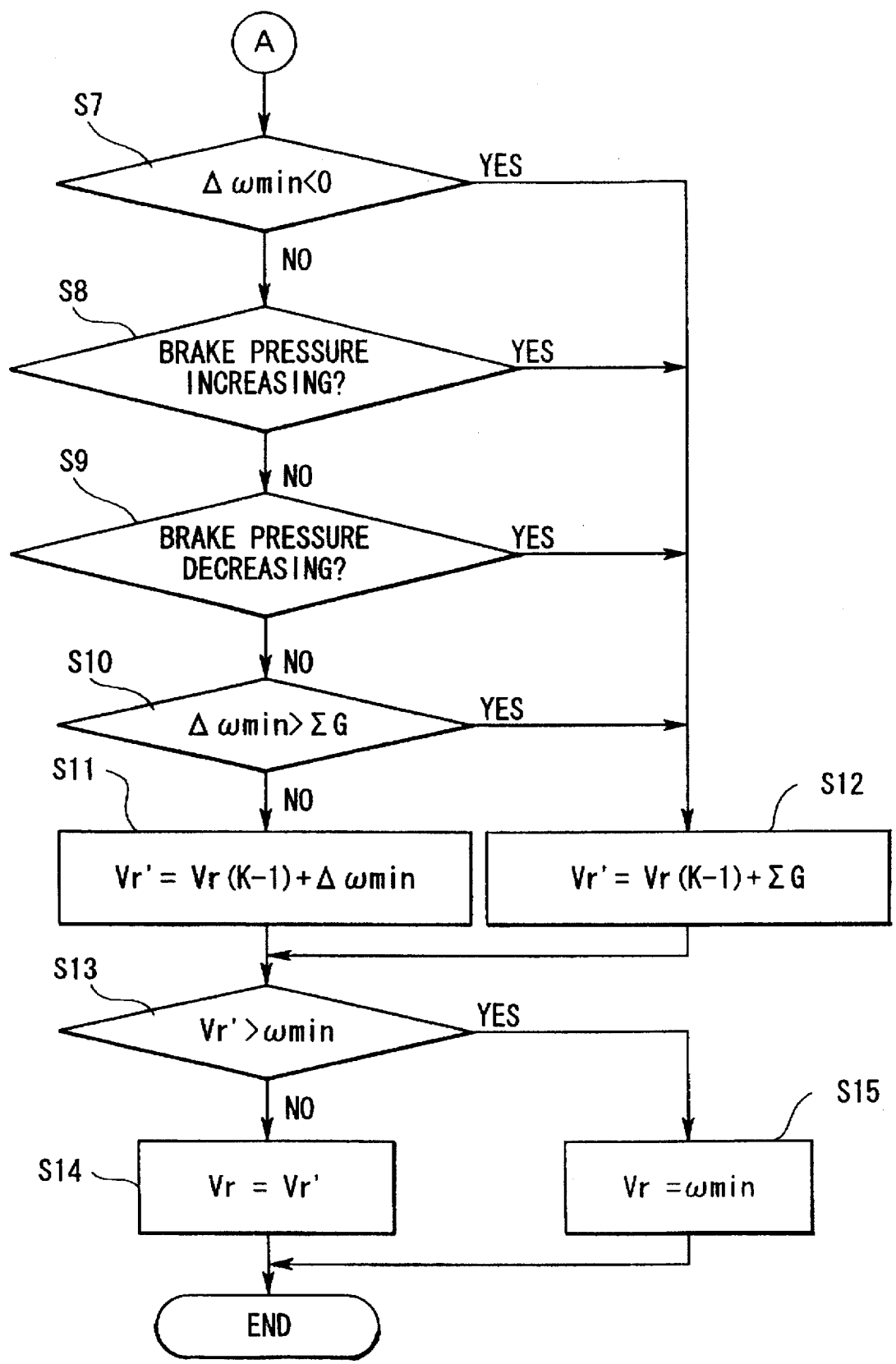
FIG. 4 is a flowchart showing a control process for calculating a vehicle speed when a vehicle is accelerated.
Figure 5:
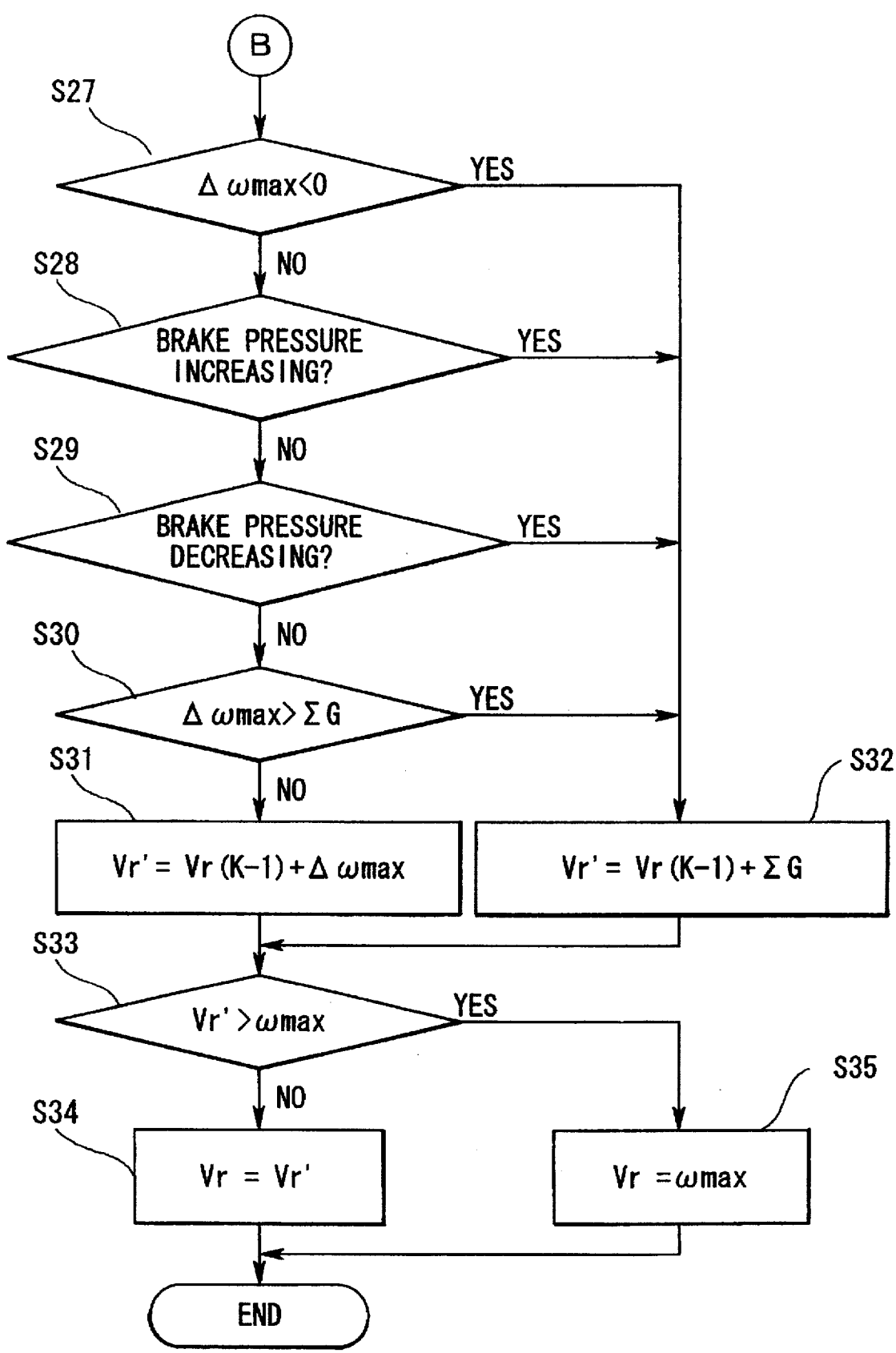
FIG. 5 is a flowchart showing a control process for calculating a vehicle speed when a vehicle is decelerated.

The calculation processes of the reference vehicle speed Vr will be described using the flowcharts shown in FIG. 3 and FIG. 5 or the time charts in FIG. 6 and FIG. 9.

At a step S1 it is checked whether or not the brake switch 17 is turned on. If it is not turned on and the vehicle is accelerated, the program goes to a step S2 where the wheel speed ω of the four wheels is read respectively. At the next step S3, the lowest wheel speed ωmin, i.e., the wheel speed of the wheel with a largest tire grip, is selected and at a step S4 the variation Δωmin of the lowest wheel speed is calculated. At a step S5 the mean value of the longitudinal acceleration G is calculated through a filtering process and at a step S6 the integrated value ΣG of the longitudinal acceleration is calculated.

Then, at a step S7 it is checked whether or not the variation Δωmin of the lowest wheel speed is negative. If the variation Δωmin is negative as shown in FIG. 6 (a), the program steps to a step S12 where the integrated value ΣG is added to the previous reference vehicle speed Vr(k−1). Thus obtained Vr' becomes a value corresponding to the actual vehicle speed being increased based on the integrated value ΣG regardless of the lowering of the wheel speed. If the variation Δωmin≧0, the program goes to a step S8 where the operation of the brake control is checked. In a case where the traction control nor the brake control is operated, the program goes to a step S10 through a step S9 and at the step S10 the smaller acceleration is selected from the deviation Δωmin and the integrated value.

Figure 6A:
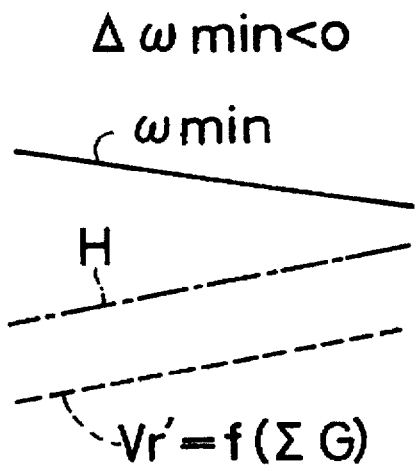
FIGS. 6a, b, c are diagrams showing three patterns for the vehicle speed calculation when a vehicle is accelerated.
Figure 6B:
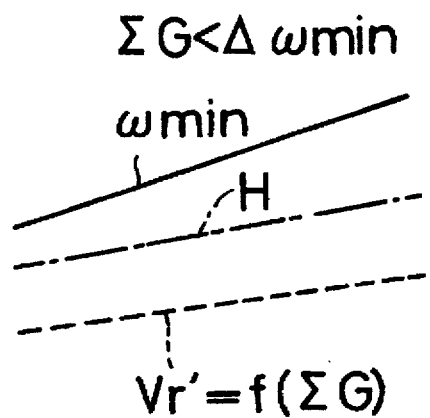
Figure 6C:
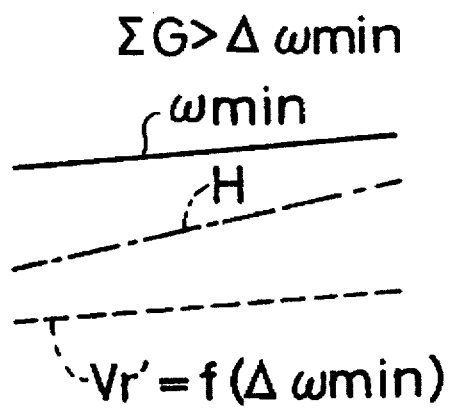

That is to say, in case of ΣG<Δωmin as shown in FIG. 6 (b), the program steps to a step S12 where the integrated value RG is added to the previous reference vehicle speed Vr(k−1). Thus obtained value Vr' is varied according to the integrated value ΣG and therefore contains a little effect of wheel slips or the like. On the other hand, in case of ΣG>Δωmin as shown in FIG. 6 (c), the variation Δωmin is added to the previous reference speed Vr(k−1). Thus obtained Vr' becomes a value varying according to the variation Δωmin, namely corresponding to the variation of the wheel speed.

The added value Vr' proceeds to a step S13 where it is compared with the current lowest wheel speed ωmin. At the state of four wheels slip, since Vr'<ωmin, the program steps to a step S14 where the added value Vr' is let to be a reference vehicle speed Vr. On the other hand, if Vr'>ωmin due to a calculation error of the reference vehicle speed or the like, the program steps to a step S15 where the lowest wheel speed ωmin is let to be a reference vehicle speed Vr.

Figure 7A:
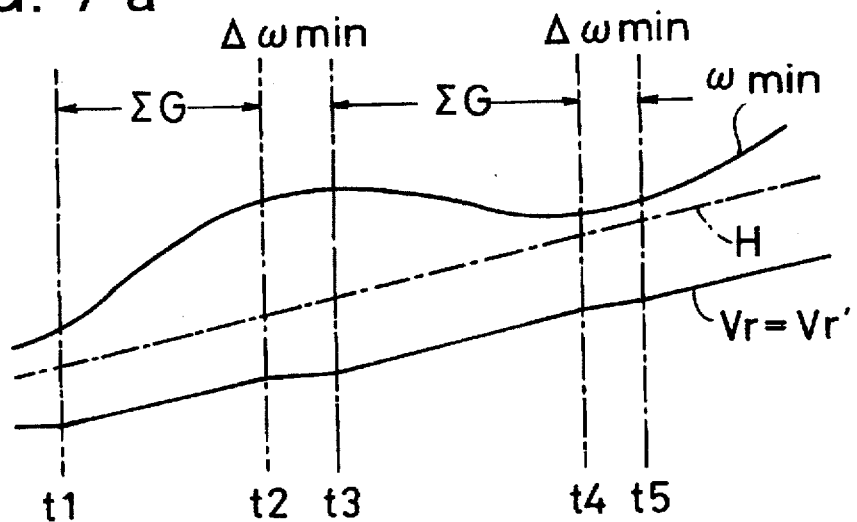
FIGS. 7a, b are diagrams showing a vehicle speed versus time when a vehicle is in a normal acceleration and when a traction control is applied respectively.
Figure 7B:
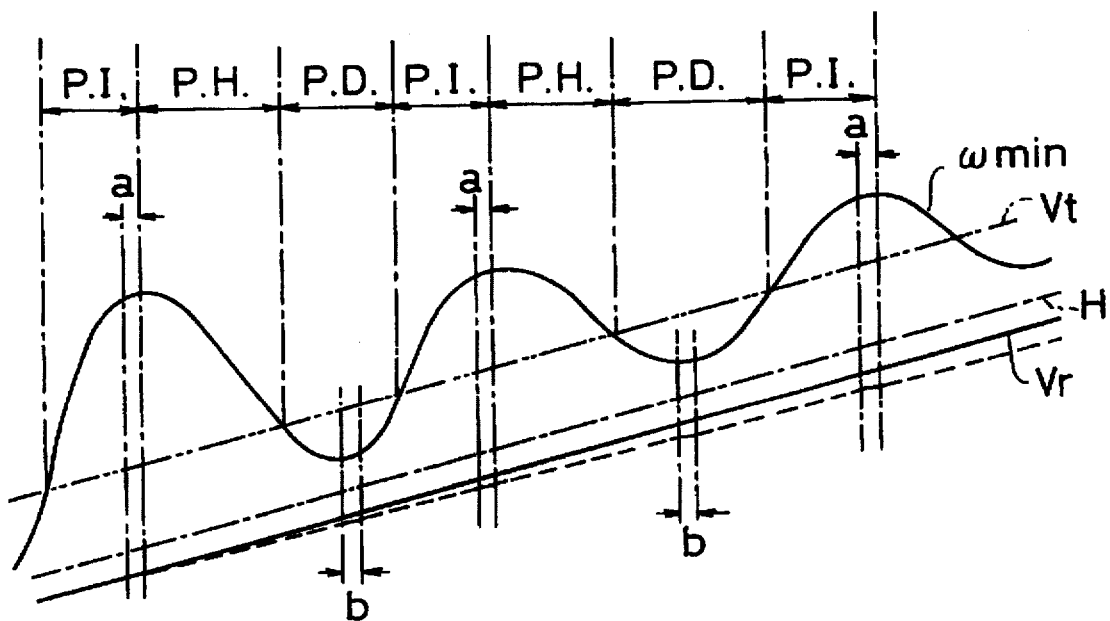

Hence, the reference vehicle speed Vr during acceleration is calculated using three patterns illustrated in FIG. 6 (a), FIG. 6 (b) and FIG. (c), i.e., ΣG in case of Δωmin<0, Δωmin or ΣG in case of Δωmin≧0 respectively. That is to say, in a case where the lowest wheel speed ωmin goes up while an increase or decrease comes alternately as shown in FIG. 7 (a), using ΣG from the time t1 to t2, using Δωmin from t2 to t3, using ΣG from t3 to t4, and using Δωmin again from t4 to t5, the reference vehicle speed Vr is calculated as illustrated in FIG. 7 (a). Thus obtained reference vehicle speed Vr approximately coincides with the vehicle speed H and, since it is free from the effect of wheel slips, it provides an enhanced accuracy.

Next, a case where the traction control is applied will be described. In this case a four wheels slip occurs due to a rapid acceleration. As shown in FIG. 7 (b), when the lowest wheel speed ωmin rises abruptly and exceeds a target wheel speed Vt for the traction control, the engine power is reduced and at the same time the brake pressure is increased, thereby an increase of the lowest wheel speed ωmin is inhibited. When an increase rate of the lowest wheel speed ωmin becomes 0 or negative, the brake pressure is kept at the holding state. When the lowest wheel speed ωmin is smaller than the target wheel speed Vt, the engine power is increased and the brake pressure is reduced, whereby the lowest wheel speed ω min is restored. By repeating these controls at a short period of time, the vehicle can make a steady acceleration without causing a fourwheel slip.

In the traction control, when the lowest wheel speed ωmin varies periodically at a short period in this way, if Δωmin≧0, the program steps from the step S7 to the step S8 in which the brake control is checked. If the brake pressure is increased, the program goes to the step S12 where the integrated value ΣG of the longitudinal acceleration is forcedly used. Namely, the reference vehicle speed Vr at the top "a" of the crest of the lowest wheel speed ωmin within a range of Δωmin<ΣG is calculated using the integrated value ΣG of the range of ωmin>0. Further, if the brake pressure is decreased at the step S9, the program steps from S9 to S12 where the integrated value ΣG is forcedly used similarly. Because of this, the reference vehicle speed Vr at the bottom "b" of the trough within a range of Δωmin<ΣG is calculated using the integrated value ΣG thereafter.

Accordingly, the reference vehicle speed Vr within a range of Δωmin<ΣG at the top "a" and the bottom "b" of the lowest wheel speed ωmin is calculated the integrated value ΣG of the longitudinal acceleration in the same way as before and after thereof. Since the reference vehicle speed is calculated in this way, even in a case where an increase of the reference vehicle speed Vr is relatively large because of a rapid acceleration, the reference vehicle speed Vr is prevented from being lowered at the top "a" and the bottom "b" of the lowest wheel speed ωmin. Further, when the lowest wheel speed ωmin varies periodically at a short period due to the traction control, the refernce vehicle speed Vr traces a continuously increasing line as shown in FIG. 7 (b) by utilizing the pressure incresing/decreasing operation of the brake control. Thus obtained reference vehicle speed Vr coincides with a vehicle speed H approximately as shown in FIG. 7 (b).

Figure 8A:
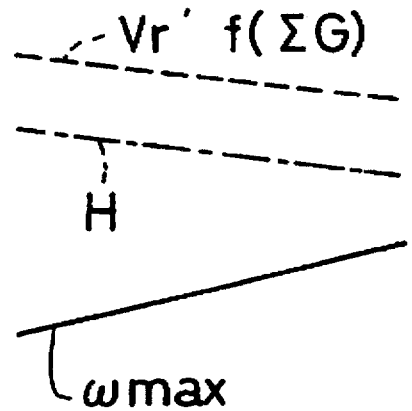
FIGS. 8a, b, c are diagrams showing three paterns for the vehicle speed calculation when a vehicle is decelerated.
Figure 8B:
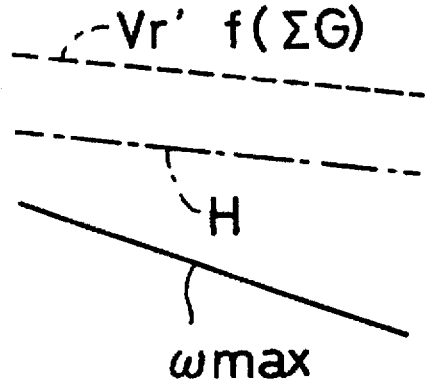
Figure 8C:
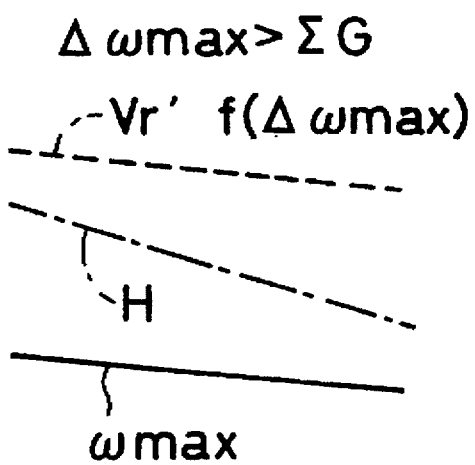

When the brake switch is turned on during deceleration, the program steps from the step S1 to a step S22 and after. As for different steps from those in the case of acceleration, at a step 23 the highest wheel speed ωmax of the wheel with a largest tire grip is selected and at a step S24 the variation Δωmax of the highest speed wheel is calculated. At a step S27, it is checked whether the variation Δωmax of the highest speed wheel is positive or not. Then, if Δωmax>0 as shown in FIG. 8 (a), the program goes to a step S32 where the integrated value RG of the longitudinal acceleration corresponding to the deceleration state of the vehicle speed is selected regardless of an increase of the wheel speed. If Δωmax≦0 and the anti-lock braking is not operated, the program goes from the step S27 to a step S30 where the variation Δωmax of the highest wheel speed is compared with the integrated value RG of the longitudinal acceleration and the smaller one is selected from these two in order to minimize an influence of the wheel lock.

That is, in case of Δωmax<RG as shown in FIG. 8 (b), the program goes to a step S32 where the integrated value RG is selected and is added to the previous reference vehicle speed Vr(k−1). In case of Δωmax>RG as shown in FIG. 8 (c), the program goes to a step S31 where the variation Δωmax is selected and is added similarly. At a step S33, the added value Vr' is compared with the present highest wheel speed ωmax and if the added value Vr' is greater than the ωmax, the program goes to a step S34 where the value Vr' is let to be a reference vehicle speed Vr. On the other hand, the value Vr' is smaller than the ωmax, the program goes to a step S35 where the highest wheel speed ωmax is let to be a reference vehicle speed Vr.

As described hereinbefore, the reference vehicle speed Vr during deceleration is calculated using the variation Δωmax of the highest wheel speed of the wheel with largest tire grip and the integrated value RG of the longitudinal acceleration and more specifically using three paterns as shown in FIG. 8 (a) to FIG. 8 (c), i.e., using RG in case of Δωmax>0, using either Δωmax or RG in case of Δωmax≦0.

Figure 9A:
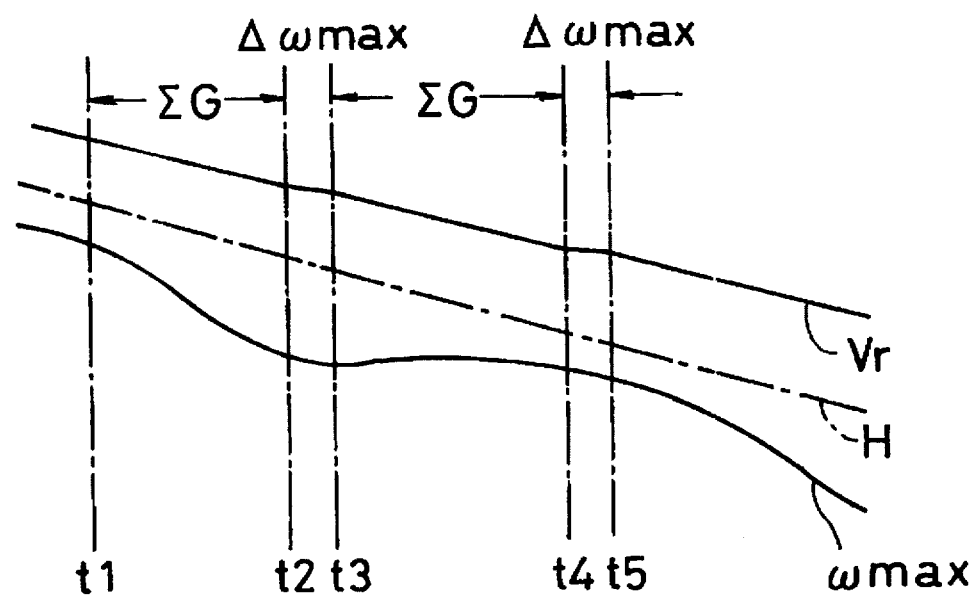
FIGS. 9a, b are diagrams showing a vehicle speed versus time when a vehicle is in a normal deceleration and when an anti-lock braking control is applied respectively.
Figure 9B:
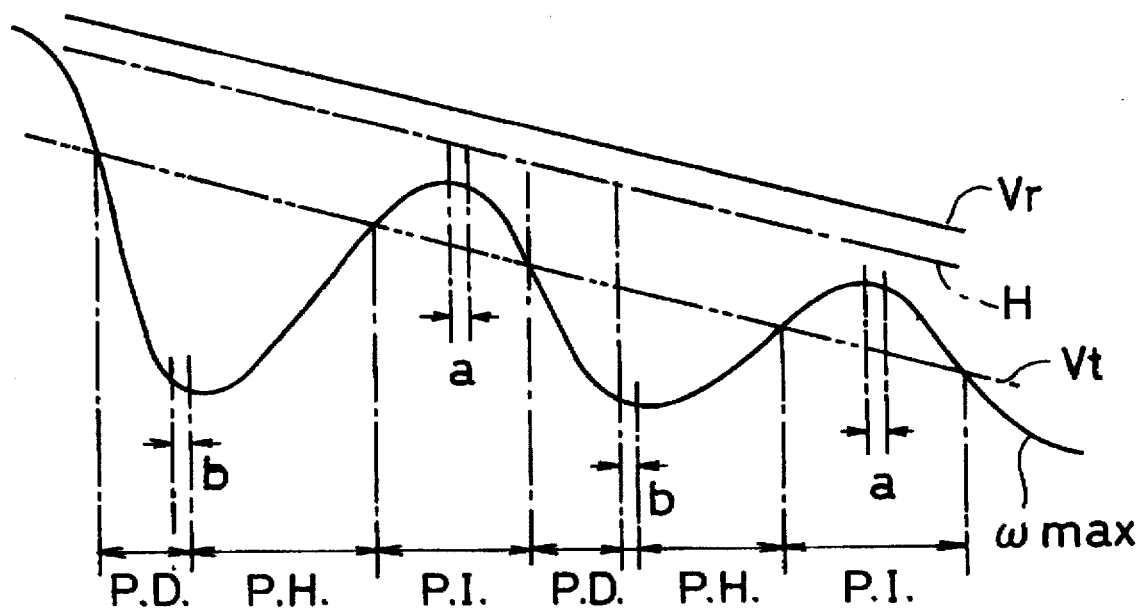

For example, when the highest wheel speed ωmax goes down while the highest wheel speed ωmax varies periodically as shown in FIG. 9 (a), the integrated value RG is used at the timing t1 to t2, the variation Δωmax is used at t2 to t3, the integrated value RG is used at t3 to t4 and the variation Δωmax is used again at t4 to t5. Then, the reference vehicle speed Vr is calculated as illustrated in the drawing. Thus obtained reference vehicle speed Vr coincides with the vehicle speed H approximately without being influenced by the wheel lock.

Next, when a fourwheel lock occurs during a rapid deceleration, the anti-lock braking control is operated. That is, when the highest wheel speed ωmax is sharply slowed down and a fourwheel lock is detected, brake pressure is decreased and a drop of the highest wheel speed ωmax is inhibited. Then, when a reduction rate of the highest wheel speed ωmax becomes 0 or negative, brake pressure is held on and when the highest wheel speed ωmax is restored to a certain level, brake pressure is increased so as to reduce the highest wheel speed ωmax again. By repeating these controls at a short period, stable braking is applied to the vehicle without causing a lock on four wheels.

In the anti-lock braking control the highest wheel speed ωmax varies at a short period as mentioned above. In case of Δωmax≦0, the program steps from the step S27 to the step S29 where the brake control is checked. During a pressure decrease operation, the program goes to the step S32 where the integrated value RG of longitudinal acceleration is forcedly used. The reference vehicle speed Vr at the bottom "b" of the trough of the highest wheel speed ωmax within a range of Δωmax>RG is calculated together with the one within a range of Δωmax<0 using the integrated value RG. On the other hand, during a pressure increase operation, the program steps from the step S28 to the step S32 where the integrated value RG of longitudinal acceleration is forcedly used. The reference vehicle speed Vr at the top "a" of the crest of the highest wheel speed ωmax within a range of Δωmax>RG is also calculated using the integrated value RG similarly.

In this case, even when the drop of the reference vehicle speed Vr is relatively large due to rapid deceleration, a rise of the reference vehicle speed Vr at the top "a" and the bottom "b" of the highest wheel speed ωmax is prevented. Because of this, when the highest wheel speed ωmax varies periodically at a short period, the reference vehicle speed Vr goes down continuously as shown in FIG. 9 (b) by the operation of pressure increase or decrease in the brake control. Further, thus obtained reference vehicle speed Vr coincides with the vehicle speed H approximately.

In summary, the vehicle speed calculation system according to the present invention can calculate a reference vehicle speed with high accuracy, since the integrated value of longitudinal acceleration is used when the vehicle is accelerated and the variation of the lowest wheel speed is negative, and when the vehicle is decelerated and the variation of the highest wheel speed is positive.

Further, even when the wheel speed varies at a short interval by the traction control or by the anti-lock braking control, the reference vehicle speed is calculated with high accuracy, since the integrated value of longitudinal acceleration is focedly employed. Hence, a fourwheel slip or lock can be detected securely even when a weak slip or lock occur on four wheels.

Further, since the reference vehicle speed can be calculated with high accuracy even in the condition of fourwheel slip or lock, the traction control or the anti-lock braking control are performed properly and therefore the vehicle stability is improved.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A vehicle speed calculation system of a fourwheel drive vehicle having an engine, wheels, a brake provided in each of said wheels, a wheel speed sensor provided in each of said wheels for detecting a wheel speed thereof and for outputting a wheel speed signal, a G sensor for detecting a longitudinal acceleration of said vehicle and for outputting a longitudinal acceleration signal, acceleration/deceleration judging means for outputting an acceleration signal when said vehicle is accelerated and for outputting a deceleration signal when said vehicle is decelerated, an anti-lock braking control apparatus, a traction control apparatus and a brake pressure control apparatus for outputting a pressure increase signal when said brake is applied, a pressure decrease signal when said brake is released and a pressure holding signal when said brake is kept at a desired level, comprising:

highest wheel speed selecting means responsive to said wheel speed signal for selecting a highest wheel speed and for outputting a highest wheel speed signal;

first variation calculating means responsive to said highest wheel speed signal for calculating a variation of said highest wheel speed per a unit time;

lowest wheel speed selecting means responsive to said wheel speed signal for selecting a lowest wheel speed and for outputting a lowest wheel speed signal;

second variation calculating means responsive to said lowest wheel speed signal for calculating a variation of said lowest wheel speed per said unit time and for outputting a variation signal of said lowest wheel speed per said unit time;

integrating means responsive to said longitudinal acceleration signal for calculating an integrated value of said longitudinal acceleration per said unit time and for outputting said integrated value; and reference vehicle speed calculating means for calculating a reference vehicle speed based on said highest wheel speed, said lowest wheel speed, said variation of said highest wheel speed per said unit time, said variation of said lowest wheel speed per said unit time, said integrated value, said acceleration signal, said deceleration signal, said pressure control signal, said pressure increase signal, said pressure decrease signal and said pressure holding signal and for outputting said reference vehicle speed so as to control said anti-lock braking control apparatus and said traction control apparatus.

2. A vehicle speed calculation system of a fourwheel drive vehicle having an engine, wheels, a brake provided in each of said wheels, a wheel speed sensor provided in each of said wheels for detecting a wheel speed thereof and for outputting a wheel speed signal, a G sensor for detecting a longitudinal acceleration of said vehicle and for outputting a longitudinal acceleration signal, acceleration/deceleration judging means for outputting an acceleration signal when said vehicle is accelerated and for outputting a deceleration signal when said vehicle is decelerated, an anti-lock braking control apparatus, a traction control apparatus and a brake pressure control apparatus for outputting a pressure increase signal when said brake is applied, a pressure decrease signal when said brake is released and a pressure holding signal when said brake is kept at a desired level, comprising:

highest wheel speed selecting means responsive to said wheel speed signal for selecting a highest wheel speed and for outputting a highest wheel speed signal;

first variation calculating means responsive to said highest wheel speed signal for calculating a variation of said highest wheel speed per a unit time;

lowest wheel speed selecting means responsive to said wheel speed signal for selecting a lowest wheel speed and for outputting a lowest wheel speed signal;

second variation calculating means responsive to said lowest wheel speed signal for calculating a variation of said lowest wheel speed per said unit time and for outputting a variation signal of said lowest wheel speed per said unit time;

integrating means responsive to said longitudinal acceleration signal for calculating an integrated value of said longitudinal acceleration per said unit time and for outputting said integrated value; and reference vehicle speed calculating means responsive to said acceleration signal for selecting said integrated value when said variation of said lowest wheel speed per a unit time is negative or when said pressure increase or said pressure decrease signals are outputted and for calculating a reference vehicle speed by using said integrated value and for outputting said reference vehicle speed so as to control said anti-lock braking control apparatus and said traction control apparatus.

3. A vehicle speed calculation system of a fourwheel drive vehicle having an engine, wheels, a brake provided in each of said wheels, a wheel speed sensor provided in each of said wheels for detecting a wheel speed thereof and for outputting a wheel speed signal, a G sensor for detecting a longitudinal acceleration of said vehicle and for outputting a longitudinal acceleration signal, acceleration/deceleration judging means for outputting an acceleration signal when said vehicle is accelerated and for outputting a deceleration signal when said vehicle is decelerated, an anti-lock braking control apparatus, a traction control apparatus and a brake pressure control apparatus for outputting a pressure increase signal when said brake is applied, a pressure decrease signal when said brake is released and a pressure holding signal when said brake is kept at a desired level, comprising:

highest wheel speed selecting means responsive to said wheel speed signal for selecting a highest wheel speed and for outputting a highest wheel speed signal;

first variation calculating means responsive to said highest wheel speed signal for calculating a variation of said highest wheel speed per a unit time;

lowest wheel speed selecting means responsive to said wheel speed signal for selecting a lowest wheel speed and for outputting a lowest wheel speed signal;

second variation calculating means responsive to said lowest wheel speed signal for calculating a variation of said lowest wheel speed per said unit time and for outputting a variation signal of said lowest wheel speed per said unit time;

integrating means responsive to said longitudinal acceleration signal for calculating an integrated value of said longitudinal acceleration per said unit time and for outputting said integrated value; and reference vehicle speed calculating means responsive to said deceleration signal for selecting said integrated value when said variation of said highest wheel speed per said unit time is positive or when said pressure increase or pressure decrease signals are outputted and for calculating a reference vehicle speed by using said integrated value and for outputting said reference vehicle speed so as to control said anti-lock braking control apparatus and said traction control apparatus.

4. The vehicle speed calculation system according to claim 1, wherein said reference vehicle speed calculating means comprise vehicle speed data selecting means, vehicle speed calculating means and vehicle speed correcting means;

said vehicle speed data selecting means responsive to said acceleration signal for selecting said integrated value of said longitudinal acceleration per said unit time and for generating an output of said integrated value when said variation of said lowest wheel speed per said unit time is negative, or when said variation of said lowest wheel speed per unit time is zero or positive and when said pressure increase signal is outputted, or when said variation of said lowest wheel speed per unit time is zero or positive and when said pressure decrease signal is outputted, or when said variation of said lowest wheel speed per said unit time is zero or positive and when pressure holding signal is outputted and when said variation of said lowest wheel speed per said unit time is larger than said integrated value of said longitudinal acceleration per said unit time;

said vehicle speed data selecting means responsive to said acceleration signal for selecting said variation of said lowest wheel speed per said unit time and for generating an output of said variation of said lowest wheel speed per said unit time when said variation of said lowest wheel speed per said unit time is zero or positive and when said pressure holding signal is outputted and when said variation of said lowest wheel speed per said unit time is equal to or smaller than said integrated value and for outputting a signal of said variation of said lowest wheel speed per unit time;

said vehicle speed data selecting means responsive to said deceleration signal for selecting said integrated value of said longitudinal acceleration per said unit time and for generating an output of said integrated value when said variation of said highest wheel speed per said unit time is positive, or when said variation of said highest wheel speed per said unit time is zero or negative and when said pressure increase signal is outputted, or when said variation of said highest wheel speed per said unit time is zero or negative and when said pressure decrease signal is outputted, or when said variation of said highest wheel speed per said unit time is zero or negative and when said pressure holding signal is outputted and when said variation of highest wheel speed per said unit time is smaller than said integrated value;

said vehicle speed data selecting means responsive to said deceleration signal for selecting said variation of said highest wheel speed per said unit time and for generating an output of said variation of said highest wheel speed per said unit time when said variation of said highest wheel speed per said unit time is zero and when said pressure holding signal is outputted and when said variation of highest wheel speed per said unit time is equal to or larger than said integrated value;

said vehicle speed calculating means for calculating a sum of said output from said vehicle speed data selecting means and a previous reference vehicle speed and for outputting said sum; and said vehicle speed correcting means for determining a reference vehicle speed by equalizing said reference vehicle speed with said lowest wheel speed when said sum is larger than said lowest wheel speed or by equalizing said reference vehicle speed with said highest wheel speed when said sum is smaller than said highest wheel speed or by equalizing said reference vehicle speed with said sum when said sum is equal to or larger than said lowest wheel speed or by equalizing said reference vehicle speed with said sum when said sum is equal to or larger than said highest wheel speed.

5. A method of calculating a vehicle speed for a fourwheel drive vehicle having an engine, wheels, a brake provided in each of said wheels, a wheel speed sensor provided in each of said wheels for detecting a wheel speed thereof and for outputting a wheel speed signal, a G sensor for detecting a longitudinal acceleration of said vehicle and for outputting a longitudinal acceleration signal, acceleration/deceleration judging means for outputting an acceleration signal when said vehicle is accelerated and for outputting a deceleration signal when said vehicle is decelerated, an anti-lock braking control apparatus, a traction control apparatus and a brake pressure control apparatus for outputting a pressure increase signal when said brake is applied, a pressure decrease signal when said brake is released and a pressure holding signal when said brake is kept at a desired level, comprising the steps of:

selecting a highest wheel speed and outputting a highest wheel speed signal;

calculating a variation of said highest wheel speed per a unit time;

selecting a lowest wheel speed and outputting a lowest wheel speed signal;

calculating a variation of said lowest wheel speed per said unit time and outputting a variation of said lowest wheel speed per said unit time;

calculating an integrated value of said longitudinal acceleration signal per said unit time and outputting said integrated value; and calculating a reference vehicle speed based on said highest wheel speed, said lowest wheel speed, said variation of said highest wheel speed per said unit time, aid variation of said lowest wheel speed per said unit time, said integrated value, said acceleration signal, said deceleration signal, said pressure control signal, said pressure increase signal, said pressure decrease signal and said pressure holding signal and outputting said reference vehicle speed so as to control said anti-lock braking control apparatus and said traction control apparatus.

6. A method of calculating a vehicle speed for a fourwheel drive vehicle having an engine, wheels, a brake provided in each of said wheels, a wheel speed sensor provided in each of said wheels for detecting a wheel speed thereof and for outputting a wheel speed signal, a G sensor for detecting a longitudinal acceleration of said vehicle and for outputting a longitudinal acceleration signal, acceleration/deceleration judging means for outputting an acceleration signal when said vehicle is accelerated and for outputting a deceleration signal when said vehicle is decelerated and a brake pressure control apparatus for outputting a pressure increase signal when said brake is applied, a pressure decrease signal when said brake is released and a pressure holding signal when said brake is kept at a desired level, comprising the steps of:

selecting a highest wheel speed and outputting a highest wheel speed signal;

calculating a variation of said highest wheel speed per a unit time;

selecting a lowest wheel speed and outputting a lowest wheel speed signal;

calculating a variation of said lowest wheel speed per said unit time and outputting said variation of said lowest wheel speed per said unit time;

calculating an integrated value of said longitudinal acceleration per said unit time and for outputting said integrated value; and selecting said integrated value when said variation of said lowest wheel speed per a unit time is negative and calculating a reference vehicle speed based on said integrated value.

7. A method of calculating a vehicle speed for a fourwheel drive vehicle having an engine, wheels, a brake provided in each of said wheels, a wheel speed sensor provided in each of said wheels for detecting a wheel speed thereof and for outputting a wheel speed signal, a G sensor for detecting a longitudinal acceleration of said vehicle and for outputting a longitudinal acceleration signal, acceleration/deceleration, judging means for outputting an acceleration signal when said vehicle is accelerated and for outputting a deceleration signal when said vehicle is decelerated and a brake pressure control apparatus for outputting a pressure increase signal when said brake is applied, a pressure decrease signal when said brake is released and a pressure holding signal when said brake is kept at a desired level, comprising:

selecting a highest wheel speed and outputting a highest wheel speed signal;

calculating a variation of said highest wheel speed per a unit time;

selecting a lowest wheel speed and outputting a lowest wheel speed signal;

calculating a variation of said lowest wheel speed per said unit time and outputting a variation signal of said lowest wheel speed per said unit time;

calculating an integrated value of said longitudinal acceleration per said unit time and outputting said integrated value; and selecting said integrated value when said variation of said highest wheel speed per said unit time is positive and calculating a reference vehicle speed based on said integrated value.

* * * * *